(12) United States Patent
Miyazaki

(10) Patent No.: US 10,981,421 B2
(45) Date of Patent: Apr. 20, 2021

(54) TIRE FOR A MOTORCYCLE FOR ROUGH TERRAIN

(71) Applicant: Sumitomo Rubber Industries, Ltd., Hyogo (JP)

(72) Inventor: Yu Miyazaki, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 216 days.

(21) Appl. No.: 16/197,476

(22) Filed: Nov. 21, 2018

(65) Prior Publication Data
US 2019/0184753 A1    Jun. 20, 2019

(30) Foreign Application Priority Data

Dec. 19, 2017    (JP) ................. JP2017-242951

(51) Int. Cl.
| | |
|---|---|
| *B60C 11/11* | (2006.01) |
| *B60C 11/12* | (2006.01) |
| *B60C 15/06* | (2006.01) |
| *B60C 11/03* | (2006.01) |
| *B60C 11/01* | (2006.01) |
| *B60C 15/00* | (2006.01) |
| *B60C 15/04* | (2006.01) |

(52) U.S. Cl.
CPC ........... *B60C 11/0309* (2013.01); *B60C 11/01* (2013.01); *B60C 11/11* (2013.01); *B60C 11/1259* (2013.01); *B60C 15/0045* (2013.01); *B60C 15/04* (2013.01); *B60C 2015/061* (2013.01); *B60C 2200/10* (2013.01); *B60C 2200/14* (2013.01)

(58) Field of Classification Search
CPC ..... B60C 11/11; B60C 11/12; B60C 11/1204; B60C 11/1236; B60C 11/1259; B60C 11/1272; B60C 15/06; B60C 15/0603; B60C 2015/061
See application file for complete search history.

(56) References Cited

U.S. PATENT DOCUMENTS

| | | | | |
|---|---|---|---|---|
| 5,234,043 | A * | 8/1993 | Suzuki ..................... | B60C 9/14 |
| | | | | 152/527 |
| 8,631,845 | B2 * | 1/2014 | Ishida ..................... | B60C 11/11 |
| | | | | 152/209.11 |

FOREIGN PATENT DOCUMENTS

| | | | |
|---|---|---|---|
| EP | 0000589 | * | 4/1981 |
| JP | 2017-136876 A | | 8/2017 |

* cited by examiner

*Primary Examiner* — Justin R Fischer
(74) *Attorney, Agent, or Firm* — Studebaker & Brackett PC

(57) ABSTRACT

A tire comprises shoulder blocks and middle blocks having ground contacting surfaces respectively provided with narrow grooves and each including a circumferential groove portion. The tire further comprises bead apex rubbers each extending from respective one of bead cores and each of the bead apex rubbers includes an extended portion extending to a position on an inner side in a tire axial direction of a first reference line passing through the circumferential groove portion of each of the shoulder blocks.

18 Claims, 6 Drawing Sheets

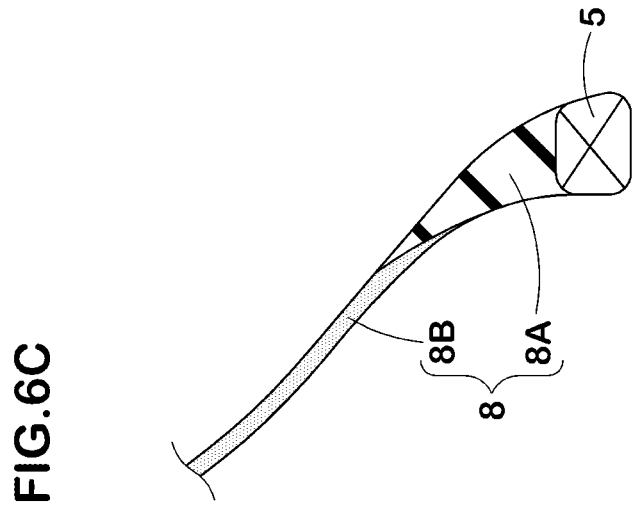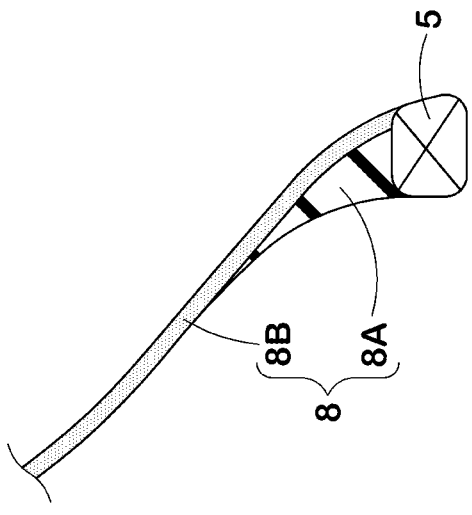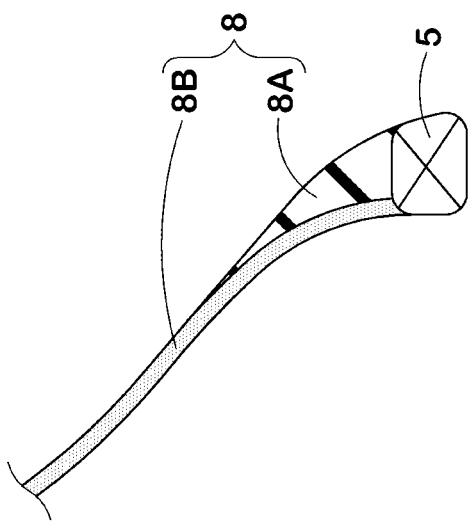

US 10,981,421 B2

TIRE FOR A MOTORCYCLE FOR ROUGH TERRAIN

TECHNICAL FIELD

The present invention relates to a tire for a motorcycle for rough terrain having improved cornering performance.

BACKGROUND ART

Japanese Unexamined Patent Application Publication No. 2017-136876 has proposed a tire for a motorcycle for rough terrain which is excellent in shock absorbing performance and cornering performance.

The proposed tire comprises a plurality of blocks (including a shoulder block) protruding from an outer surface of a tread main body and a bead apex extending radially outwardly from a bead core. A radially outer end of the bead apex terminates between a boundary end and an intersection point. The boundary end is defined as an outer end in a tire axial direction at a boundary surface between the outer surface of the tread main body and the shoulder block. The intersection point is defined as a point where a straight line extending perpendicularly to a ground contacting surface of the shoulder block passing through an outer end in the tire axial direction of the ground contacting surface intersects with the outer surface of the tread main body.

In this tire, the bead apex extends from the bead core to a root portion of the shoulder block, therefore, substantially the entire region of a sidewall is reinforced while suppressing an increase in rigidity of the tread, thereby, it is possible that side rigidity is increased. Therefore, it is possible that the cornering performance is improved while securing excellent shock absorbing performance.

However, even in the proposed tire, when used for off-road motorcycle competitions (such as trial competitions) under severe running conditions, the shoulder block has insufficient rigidity at the time of jumping or cornering, therefore, satisfactory cornering performance cannot be obtained.

On the other hand, in order to increase lateral grip force, it is preferred that a narrow groove including a groove portion extending in a tire circumferential direction in the shoulder block. However, when this narrow groove is applied to the proposed tire, the rigidity of the shoulder block is decreased by the narrow groove, therefore, it becomes disadvantageous for the cornering performance.

SUMMARY OF THE INVENTION

An object of the present invention is to provide a tire for a motorcycle for rough terrain capable of improving the cornering performance by increasing the rigidity of the shoulder block while increasing the lateral grip force.

In one aspect of the present invention, a tire comprises a tread portion comprising rows of shoulder blocks forming tread edges and rows of middle blocks arranged on an inner side in a tire axial direction of the shoulder blocks, a carcass including an inner ply extending between bead cores of bead portions via the tread portion and sidewall portions, and bead apex rubbers each extending from respective one of the bead cores, wherein a ground contacting surface of each of the shoulder blocks and the middle blocks is provided with a narrow groove including a circumferential groove portion extending in a tire circumferential direction, and each of the bead apex rubbers includes an extended portion extending to a position on the inner side in the tire axial direction of a first reference line perpendicular to the ground contacting surface of each of the shoulder blocks and passing through the circumferential groove portion thereof.

In another aspect of the invention, it is preferred that an outer end in a tire radial direction of the extended portion is positioned on an outer side in the tire axial direction of a second reference line perpendicular to the ground contacting surface of each of the middle blocks and passing through the circumferential groove portion thereof.

In another aspect of the invention, it is preferred that the carcass includes an outer ply covering the outer end in the tire radial direction of the extended portion.

In another aspect of the invention, it is preferred that the inner ply has ply turned up portions each turned up around respective one of the bead cores, and the outer ply covers outer ends in the tire radial direction of the ply turned up portions of the inner ply.

In another aspect of the invention, it is preferred that number of carcass cords of the outer ply per 5 cm of ply width thereof is not less than 44 (per 5 cm).

BRIEF DESCRIPTION OF THE DRAWINGS

FIG. 6A is a cross-sectional view showing an extended portion according to another embodiment.

FIG. 6B is a cross-sectional view showing an extended portion according to another embodiment.

FIG. 6c is a cross-sectional view showing an extended portion according to another embodiment.

DESCRIPTION OF THE PREFERRED EMBODIMENT

An embodiment of the present invention will now be described in conjunction with accompanying drawings.

Figure 1:
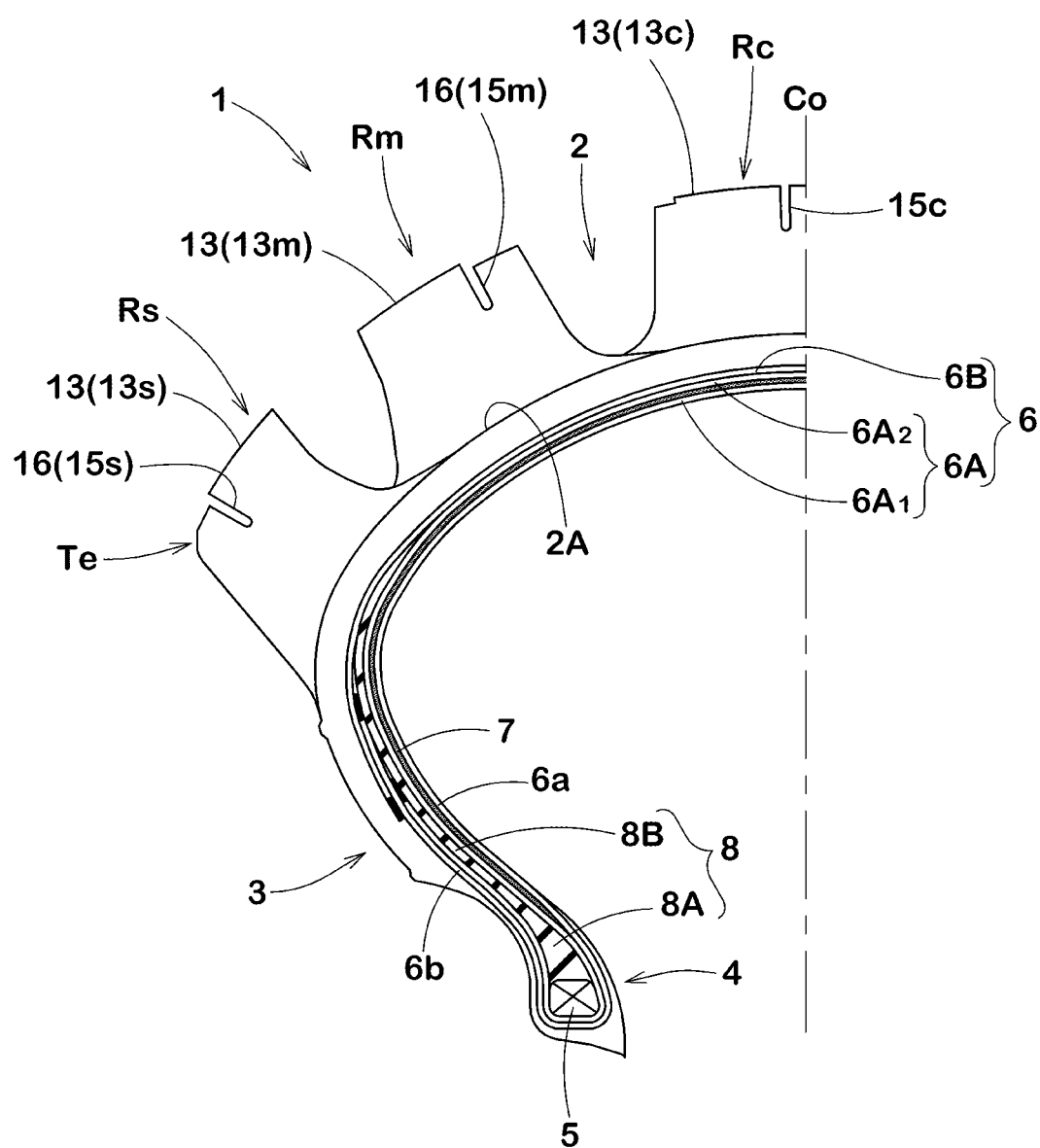
FIG. 1 is a cross-sectional view of a tire for a motorcycle for rough terrain according to an embodiment of the present invention.

As shown in FIG. 1, a tire 1 for a motorcycle for rough terrain in this embodiment (hereinafter may be simply referred to as a tire 1) is a tire used for off-road motorcycle competition, and has a block pattern composed of a plurality of blocks 13 in a tread portion 2. Each of the blocks 13 is raised from a bottom surface 2A of sea region of the tread portion 2.

The blocks 13 includes rows (Rs) of shoulder blocks 13s forming tread edges (Te) and rows (Rm) of middle blocks 13m each arranged on an inner side in the tire axial direction of the shoulder blocks 13s of respective one of the rows (Rs). In this embodiment, an example is shown in which a row (Rc) of center blocks 13c is arranged on an axially inner side of the middle blocks 13m, that is, arranged between the rows (Rm).

Figure 4:
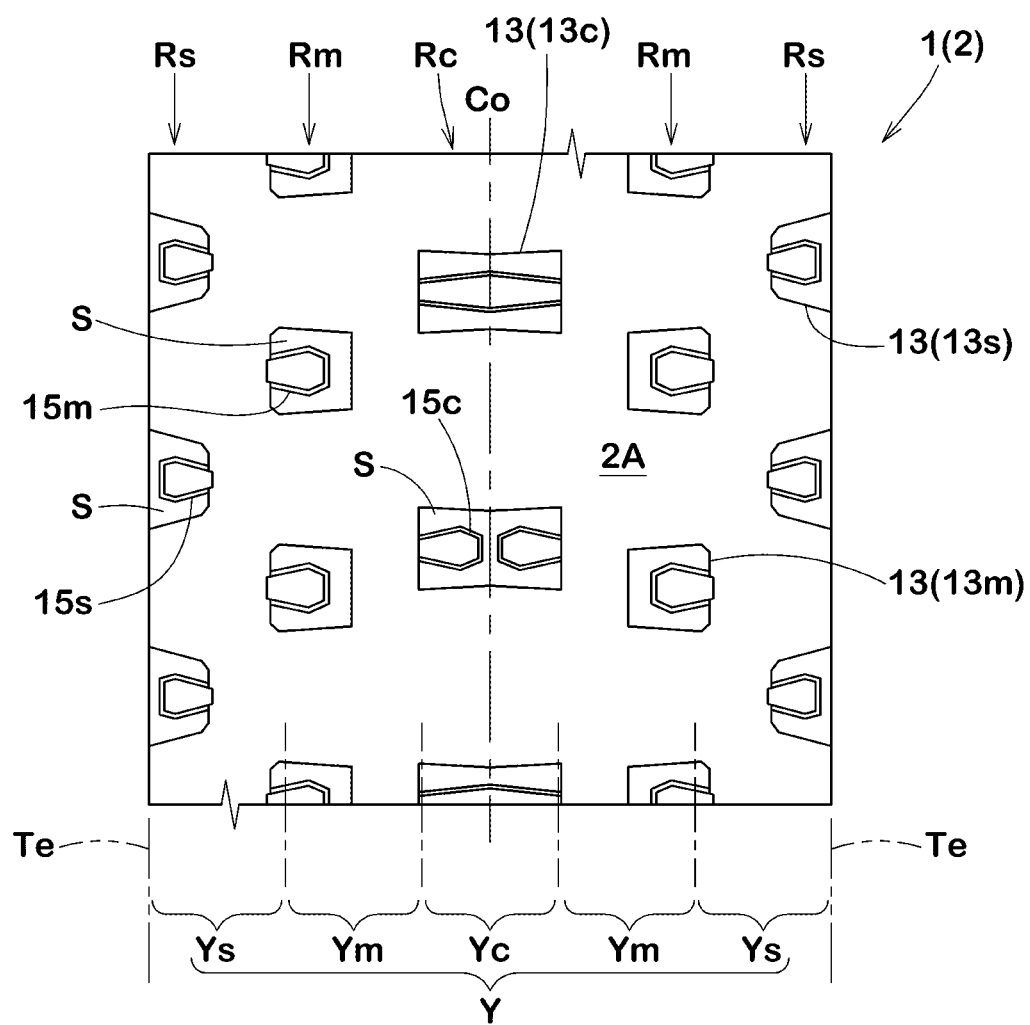
FIG. 4 is a development view showing a tread pattern.

Specifically, as shown in FIG. 4, when a width region (Y) between the tread edges (Te) is divided into five equal parts namely a pair of shoulder regions (Ys), a pair of middle regions (Ym), and a center region (Yc), each of the shoulder blocks 13s has a center of gravity located within respective one of the shoulder regions (Ys). Each of the middle blocks 13m has a center of gravity located within respect one of the middle regions (Ym). Further, each of the center blocks 13c has a center of gravity located within the center region (Yc).

A narrow groove 15s is arranged on a ground contacting surface (s) of each of the shoulder blocks 13s. A narrow groove 15m is arranged on a ground contacting surface (s) of each of the middle blocks 13m. In this embodiment, a narrow groove 15c is also arranged on a ground contacting surface (s) of each of the center blocks 13c. Note that the "narrow groove" means a groove having a groove width not more than 2.5 mm, and a slit-like sipe is included, for example.

Figure 5A:
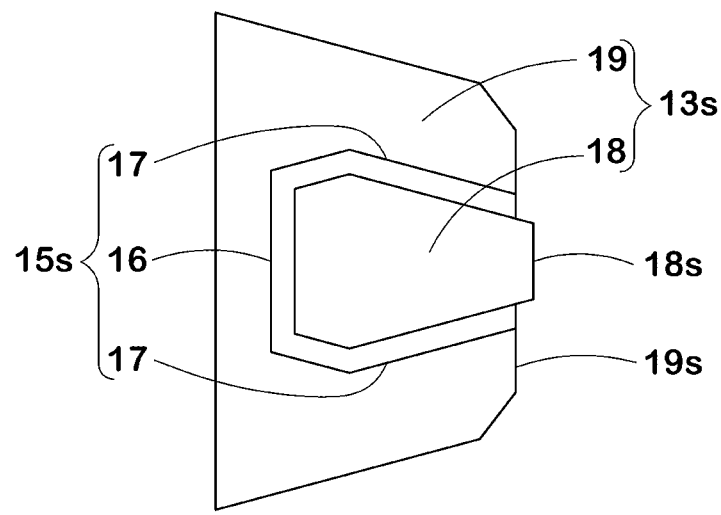
FIG. 5A is a plan view showing one of shoulder blocks.
Figure 5B:
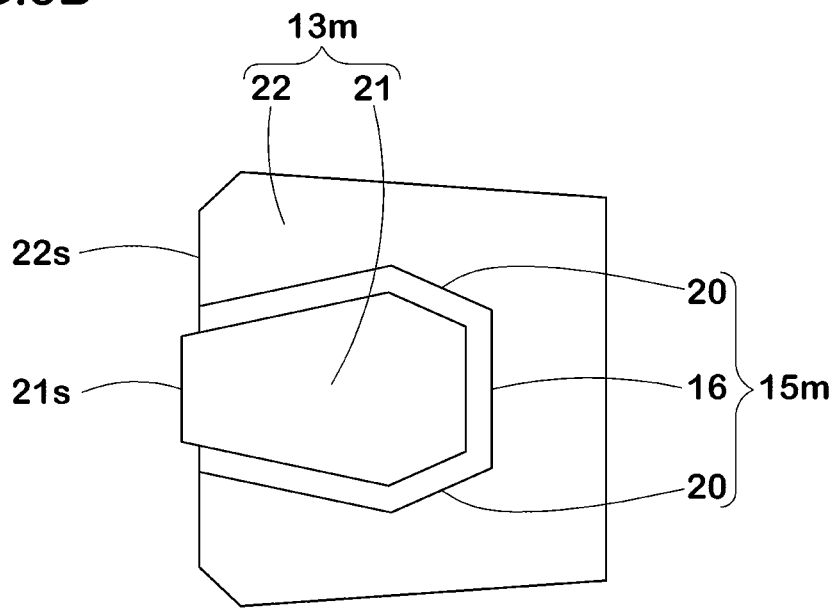
FIG. 5B is a plan view showing one of middle blocks.

As shown in FIGS. 5A and 5B, at least each of the narrow grooves 15s and 15m includes a circumferential groove portion 16 extending in the tire circumferential direction.

Each of the narrow grooves 15s in this embodiment has a substantially U-shaped configuration. Specifically, each of the narrow grooves 15s includes the circumferential groove portion 16 and a pair of axial groove portions 17 extending inwardly in the tire axial direction from both ends of the circumferential groove portion 16. Each of the axial groove portions 17 has an opening connected with a block side surface on an inner side in the tire axial direction of respective one of the shoulder blocks 13s. Thereby, each of the shoulder blocks 13s is divided into an inner block portion 18 surrounded by the narrow groove 15s and an outer block portion 19 as the remaining portion. On the block side surface on the axially inner side of each of the shoulder blocks, a side surface 18s of the inner block portion 18 protrudes axially inwardly more than side surfaces 19s of the outer block portion 19. Therefore, edge components with respect to the tire circumferential direction is increased.

Like the narrow grooves 15s, each of the narrow grooves 15m in this embodiment has a substantially U-shaped configuration. Specifically, each of the narrow grooves 15m includes the circumferential groove portion 16 and a pair of axial groove portions 20 extending outwardly in the tire axial direction from both ends of the circumferential groove portion 16. Each of the axial groove portions 20 has an opening connected with a block side surface on an outer side in the tire axial direction of respective one of the middle blocks 13m. Thereby, each of the middle blocks 13m is divided into an inner block portion 21 surrounded by the narrow groove 15m and an outer block portion 22 as the remaining portion. On the block side surface on the axially outer side of each of the middle blocks, a side surface 21s of the inner block portion 21 protrudes axially outwardly more than side surfaces 22s of the outer block portion 22. Therefore, edge component with respect to the tire circumferential direction is increased.

The circumferential groove portion 16 may be inclined with respect to the tire circumferential direction line. In this case, the inclination angle with respect to the tire circumferential direction line is preferably not more than 45 degrees, more preferably not more than 30 degrees, further preferably not more than 15 degrees. Each of the narrow grooves 15s and/or the narrow grooves 15m may be formed only by the circumferential groove portion 16, for example. In this case, from the point of view of a lateral gripping property, it is preferred that at least one end of the circumferential groove portion 16 has the opening connected with the circumferential side surface of the shoulder block 13s and/or the middle block 13m.

As shown in FIG. 1, the tire 1 includes a carcass 6 forming a framework of the tire 1 and a pair of bead apex rubbers 8 each extending from respective one of bead cores 5.

The carcass 6 includes an inner ply 6A extending between the bead cores 5 of bead portions 4 via the tread portion 2 and sidewall portions 3. In this embodiment, an example is shown in which the carcass 6 includes an outer ply 6B arranged on an outer side in a tire radial direction of the inner ply 6A.

The inner ply 6A in this embodiment is composed of first and second plies 6A1 and 6A2 overlapping with each other in the tire radial direction. Each of the first and the second plies 6A1 and 6A2 has a ply main body portion (6a) extending between the bead cores 5 and ply turned up portions (6b) arranged at both ends of the ply main body portion (6a) and each turned up around respective one of the bead cores 5 from inside to outside in the tire axial direction.

Figure 2:
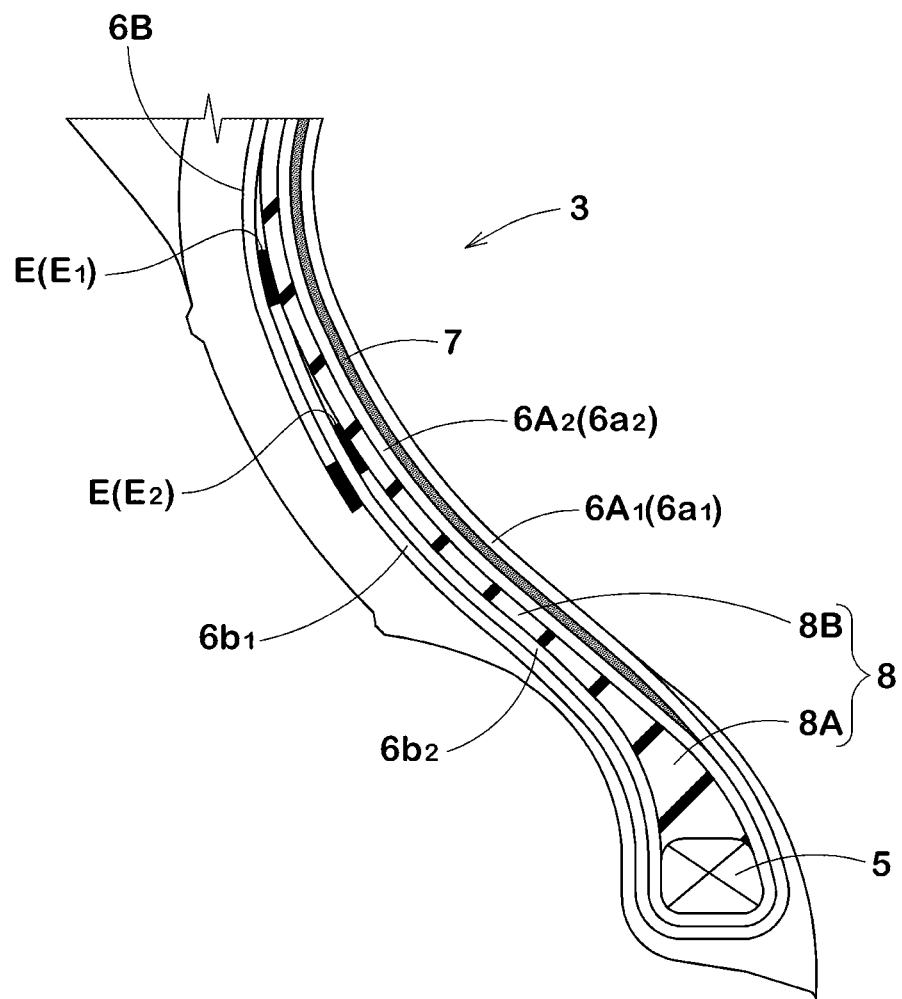
FIG. 2 is an enlarged cross-sectional view of one of bead portions.

As shown in FIG. 2, in this embodiment, an insulation rubber layer 7 7 is disposed between a ply main body portion 6a1 of the first ply 6A1 which is arranged on a radially inner side and a ply body portion 6a2 of the second ply 6A2 which is arranged on a radially outer side. Thereby, when the sidewall portions 3 are bent and deformed, a strong tension is applied to carcass cords of the second ply 6A2, therefore, the side rigidity is increased. It is preferred that a thickness of the insulation rubber layer 7 is in a range of from 0.3 to 1.5 mm. Further, it is preferred that each of the radially inner ends of the insulation rubber layer 7 terminates on a radially inner side of the radially outer end of respective one of the bead apex rubbers 8. The insulation rubber layer 7 can be formed of the same rubber as topping rubber of the carcass 6, but it is preferred that the insulation rubber layer 7 is formed of rubber having a larger rubber hardness than the topping rubber of the carcass 6.

An outer end E1 of a ply turned up portion 6b1 of the first ply 6A1 terminates on a radially outer side of an outer end E2 of a ply turned up portion 6b2 of the second ply 6A2 which is arranged on a radially outer side of the first ply 6A1. That is, the ply turned up portion 6b1 covers and protects the outer end E2 of the ply turned up portion 6b2.

Further, each of the first and the second plies 6A1 and 6A2 has the carcass cords arranged at an angle in a range of from 15 to 45 degrees with respect to a tire equator (Co), for example. The inclination direction of the carcass cords of the first ply 6A1 and the inclination direction of the carcass cords of the second ply 6A2 are opposite to each other with respect to the tire equator (Co). Thereby, the carcass 6 has a so-called bias structure in which the carcass cords of one of the plies are arranged so as to intersect with the carcass cords of the other one of the plies.

The outer ply 6B is arranged on the radially outer side of the inner ply 6A. The outer ply 6B in this embodiment is formed of one ply having the carcass cords arranged at an an angle in a range of from 15 to 45 degrees with respect to the tire equator (Co), for example.

The outer ply 6B extends inward in the tire radial direction beyond radially outer ends (E) of the ply turned up portions (6b) of the inner ply 6A. Thereby, the radially outer ends (E) of the ply turned up portions (6b) are covered. Note that when the inner ply 6A is composed of a plurality of plies 6A1 and 6A2 as in this embodiment, at least one of the ply turned up portions 6b1 and 6b2 is covered at the outer end thereof.

Each of the bead apex rubbers 8 includes a main portion 8A having a triangular cross section and extending radially outwardly for a relatively short distance from respective one of the bead cores 5 and an extended portion 8B connected with the main portion 8A. As the bead apex rubbers 8, that is, as the main portions 8A and the extended portions 8B, hard rubber having rubber hardness in the range of from 50 to 85 is suitably used. The rubber hardness is hardness measured by a type-A durometer under an environment of 23 degrees celsius in accordance with Japanese Industrial standard JIS-K6253.

The extended portion 8B is connected with the main portion 8A and extends radially outwardly with a substantially constant thickness. "substantially constant" means, in consideration of variations in thickness due to vulcanization, that a ratio tmin/tmax between a maximum thickness (tmax) and a minimum thickness (tmin) is in the range of from 0.5 to 1.0.

Figure 3:
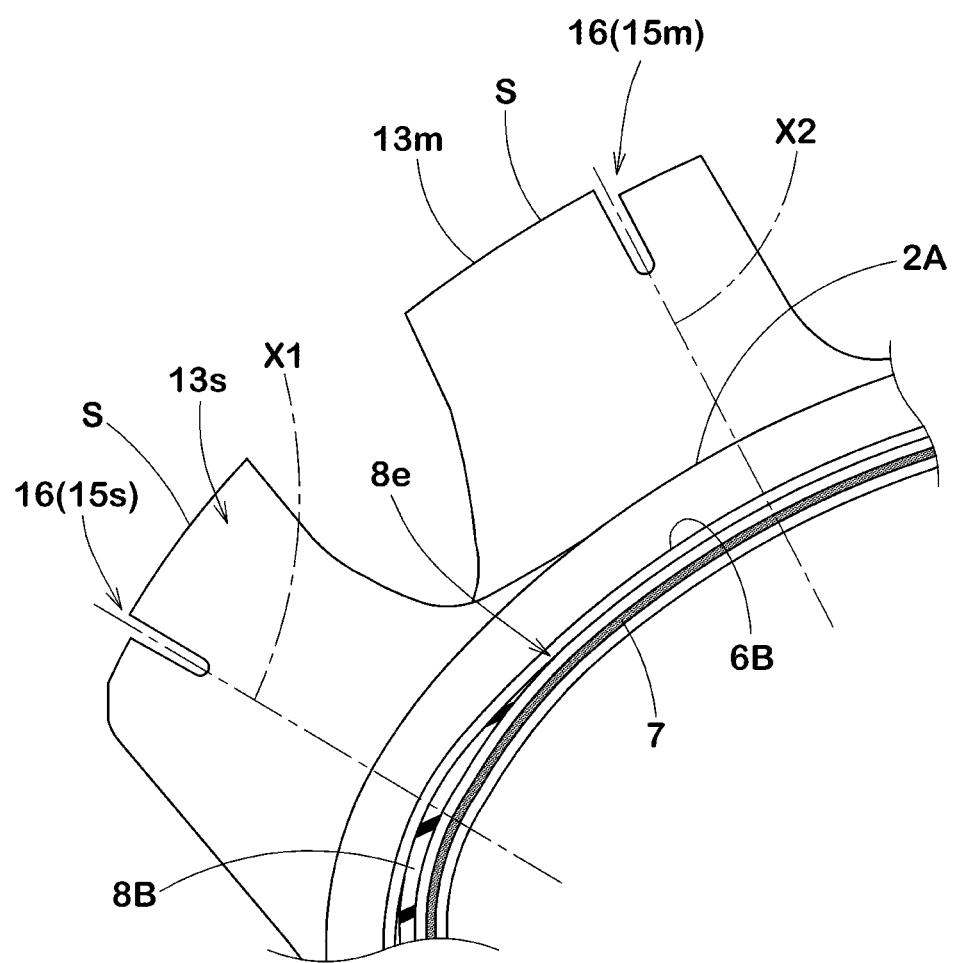
FIG. 3 is an enlarged cross-sectional view of one of shoulder regions.

As shown in FIG. 3, the thickness of the extended portion 8B gradually decreases at a radially outer end portion thereof toward a radially outer end (8e). Thereby, a region thereof within 20 mm from the outer end (8e) is excluded from "substantially constant". In this embodiment, the case where the main portion 8A and the extended portion 8B have the same rubber composition is shown. However, it is also possible that the rubber composition is different between the main portion 8A and the extended portion 8B.

FIGS. 6A to 6C show examples of the structure in the case where the rubber composition is different between the main portion 8A and the extended portion 8B. In FIG. 6A, the extended portion 8B extends radially outwardly from the bead core 5 while being in contact with an axially outer side surface of the main portion 8A. In FIG. 6B, the extended portion 8B extends radially outwardly from the bead core 5 while being in contact with an axially inner side surface of the main portion 8A. In FIG. 6c, the extended portion 8B extends radially outwardly from a radially outer end of the main portion 8A. However, it is not limited to this, and various structures may be adopted.

The outer end (8e) of the extended portion 8B is positioned on an axially inner side of a first reference line x1 defined below. The "first reference line x1" is defined as a line perpendicular to the ground contacting surface (s) of each of the shoulder blocks (13s) and passing through the circumferential groove portion 16 thereof.

Further, in this embodiment, the outer end (8e) of the extended portion 8B is positioned on an axially outer side of a second reference line x2 defined below. That is, in this embodiment, the outer end (8e) terminates between the first reference line x1 and the second reference line x2. The "second reference line x2" is defined as a line perpendicular to the ground contacting surface (S) of each of the middle blocks (13m) and passing through the circumferential groove portion 16 thereof.

Strictly speaking, each of the first reference line x1 and the second reference line x2 passes through a groove width center of the respective circumferential groove portion 16. In the case where the circumferential groove portion 16 itself is not formed perpendicularly to the ground contacting surface (S), the first reference line x1 and the second reference line x2 are formed so as to pass through the groove width center of the circumferential groove portion 16 at a groove bottom thereof. Further, when the circumferential groove portion 16 itself is inclined with respect to the tire circumferential direction line, it passes through the groove width center at the groove bottom of the circumferential groove portion 16 at an axially inner end portion thereof.

As described above, the extended portion 8B extends axially inwardly beyond the first reference line x1, therefore, parts under the circumferential groove portions 16 can be reinforced, thereby, it is possible that the rigidity of the shoulder blocks 13s can be increased. Therefore, it is possible that the lateral grip force due to the edge effect of the circumferential groove portions 16 and cornering force due to the rigidity increase of the shoulder blocks 13s are increased, thereby, it is possible that the cornering performance is improved.

Further, the outer end (8e) of the extended portion 8B, which is a point of change in rigidity, is not located in the sidewall portions 3, therefore, it is possible that the distribution of the side rigidity is made uniform. Thereby, it is possible to realize a uniform bending in the entire tire in any load region from a small load such as when running on a gap to a large load such as jump landing, therefore, it is possible that steering stability is improved.

Further, in this embodiment, the outer end (8e) of the extended portion 8B is positioned on the axially outer side of the second reference line x2. Therefore, it is possible that the rigidity of the center region (Yc), which contacts with the ground in an upright posture, is suppressed to a low level. Thereby, during running straight, it is possible that traction is secured by suppressing decrease of the ground contacting area, as well as it is possible that excellent shock absorbing performance is maintained.

When the outer end (8e) of the extended portion 8B terminates under the shoulder blocks or under the middle blocks, the rubber of the outer end (8e) of the extended portion 8B is pushed into the shoulder blocks 13s or the middle blocks 13m during vulcanization, therefore, block rigidity thereof tends to be excessively increased. As a result, it becomes disadvantageous to the shock absorbing performance. Further, the outer end (8e) serves as the point of change in rigidity under the sea region, therefore, stress concentrates around the outer end (8e), thereby, durability tends to be deteriorated.

Therefore, the outer ply 6B in this embodiment covers the outer end (8e). Thereby, the rubber of the outer end (8e) is suppresses from being pushed, therefore, the deterioration of the shock absorbing performance is suppressed, and also the concentration of stress around the outer end (8e) is suppressed, thereby, the durability is improved.

Note that, in order to suppress the rubber of the outer end (8e) from being pushed, it is preferred that the number of the carcass cords of the outer ply 6B per 5 cm of ply width is not less than 44 (per 5 cm). When the number of the carcass cords is less than 44 (per 5 cm), the gap between the carcass cords is too wide, therefore, it is difficult that the rubber of the extended portion 88 is sufficiently suppressed from being pushed. Note that the upper limit of the number of the carcass cords is appropriately set within a range where the carcass cords do not contact each other.

In this embodiment, an example is shown in which the extended portion 8B extends from the radially outer end of the main portion 8A of the bead apex rubber 8. However, as shown in FIGS. 6A and 6B, it is possible that the extended portion 8B extends radially outwardly from the bead core 5 while being adjacent to the inner side surface or the outer side surface of the main portion. Further, as shown in FIG. 5c, the extended portion 88 may be formed integrally of the same rubber as the main portion 8A. In this case, the extended portion 88 is defined as a portion extending radially outwardly with a substantially constant thickness.

While detailed description has been made of the tire as an especially preferred embodiment of the present invention, the present invention can be embodied in various forms without being limited to the illustrated embodiment.

EXAMPLE (WORKING EXAMPLE)

Tires for a motorcycle for rough terrain (120/80-19) having the internal structure shown in FIG. 1 were made by way of test according to the specifications listed in Table 1. The same block pattern (shown in FIG. 4) is formed in the tread portion of each of the test tires.

Common specifications are as follows.
Rubber hardness of bead apex rubber - - - 81
Thickness of extended portion - - - 1.0 mm Rubber hardness of insulation rubber layer - - - 54
Thickness of insulation rubber layer - - - 0.5 mm
Number of cords of outer ply - - - 44 (per 5 cm)

Straight running performance, the cornering performance, and the durability of each of the test tires were evaluated by the following field running test.

<Field Running Test>

Each of the test tires was mounted on a rim (2.15×19) of a rear wheel of a motorcycle (displacement of 450 cc) specialized for a motocross/off-road competition under the condition of the tire inner pressure (80 kPa). On the front wheel, a commercially available tire (90/100-21), was mounted on a rim (1.60×21) under the condition of the tire inner pressure (80 kPa), Then a driver drove the motorcycle on a test course for a motocross competition and evaluated the following performances by the driver's feeling.

(1) straight Runni ng Performance:

In a field running test, steering stability (shock absorption and traction) during running straight, including running on a gap and jump landing, was evaluated by the driver's feeling. The results are indicated by an index based on Reference 1 being 100, wherein the larger the numerical value, the better the straight running performance is.

(2) Cornering Performance:

In a field running test, the steering stability (the shock absorption and cornering characteristics) during cornering was evaluated by the driver's feeling. The results are indicated by an index based on the Reference 1 being 100, wherein the larger the numerical value, the better the cornering performance is.

Durability:

In a field running test, change of the steering stability after running on the test course for two hours (running on the test course four times each for 30 minutes with a 30-minute break) was evaluated by the driver's feeling. The results are indicated by an index based on the Reference 1 being 100, wherein the larger the numerical value, the smaller the decrease of the steering stability is, which is better.

TABLE 1

|  | Ref. 1 | Ex. 1 | Ex. 2 | Ref. 2 | Ex. 3 |
| --- | --- | --- | --- | --- | --- |
| Presence or Absence of Circumferential groove portions of Shoulder blocks or Middle blocks | presence | presence | presence | presence | presence |
| Presence or Absence of Extended portion | absence | presence | presence | presence | presence |
| Positional relation of Extended portion |  |  |  |  |  |
| with respect to First reference line x1 | — | inner side | inner side | outer side | inner side |
| with respect to First reference line x1 | — | outer side | outer side | outer side | inner side |
| Presence or Absence of Outer ply | — | presence | absence | presence | presence |
| Covering Outer end of Extended portion | — | yes | — | yes | yes |
| Straight running performance | 100 | 120 | 108 | 60 | 60 |
| Cornering performance | 100 | 120 | 108 | 60 | 110 |
| Durability | 100 | 120 | 80 | 100 | 120 |

As shown in the table, it was confirmed that the tires as Examples were excellent in the cornering performance.

The invention claimed is:

1. A tire for a motorcycle for rough terrain, the tire comprising:
    a tread portion comprising rows of shoulder blocks forming tread edges and rows of middle blocks arranged on an inner side in a tire axial direction of the shoulder blocks,
    a carcass including an inner ply extending between bead cores of bead portions via the tread portion and sidewall portions, and
    bead apex rubbers each extending from a respective one of the bead cores, wherein
    a ground contacting surface of each of the shoulder blocks and the middle blocks is provided with a narrow groove including a circumferential groove portion extending in a tire circumferential direction,
    each of the bead apex rubbers includes an extended portion extending to a position on the inner side in the tire axial direction of a first reference line perpendicular to the ground contacting surface of each of the shoulder blocks and passing through the circumferential groove portion thereof,
    each axially half of the tread portion includes one of the rows of the shoulder blocks arranged closest to the respective tread edge, one of the rows of the middle blocks arranged next to the row of the shoulder blocks on an axially inner side, and a circumferential groove extending continuously in the tire circumferential direction between the row of the shoulder blocks and the row of the middle blocks,
    in each axially half cross section of the tire, the extended portion extends so as not to pass through the circumferential groove,
    the carcass includes an outer ply covering the outer end in the tire radial direction of the extended portion,
    the inner ply has a ply main body portion extending between the bead cores and ply turned up portions each turned up around a respective one of the bead cores,
    the inner ply is composed of a first ply and a second ply overlapping with each other in the tire radial direction such that the ply main body portion of the second ply is arranged radially outside the ply main body portion of the first ply,
    an insulation rubber layer is disposed between the ply main body portion of the first ply and the ply main body portion of the second ply, and
    each of radially inner ends of the insulation rubber layer terminates on a radially inner side of the radially outer end of a respective one of the bead apex rubbers.

2. The tire for a motorcycle for rough terrain according to claim 1, wherein
    an outer end in a tire radial direction of the extended portion is positioned on an outer side in the tire axial direction of a second reference line perpendicular to the ground contacting surface of each of the middle blocks and passing through the circumferential groove portion thereof.

3. The tire for a motorcycle for rough terrain according to claim 1, wherein
    the inner ply has ply turned up portions each turned up around respective one of the bead cores, and the outer ply covers outer ends in the tire radial direction of the ply turned up portions of the inner ply.

4. The tire for a motorcycle for rough terrain according to claim 1, wherein
number of carcass cords of the outer ply per 5 cm of ply width thereof is not less than 44 (per 5 cm).

5. The tire for a motorcycle for rough terrain according to claim 1, wherein
the narrow groove has groove width not more than 2.5 mm,
the narrow groove includes the circumferential groove portion and a pair of axial groove portions extending outwardly in the tire axial direction from both ends of the circumferential groove portion, and
each of the axial groove portions has an opening connected with a block side surface on an outer side in the tire axial direction of the block.

6. The tire for a motorcycle for rough terrain according to claim 1, wherein the insulation rubber layer is formed of rubber having a larger rubber hardness than a topping rubber of the carcass.

7. A tire for a motorcycle for rough terrain, the tire comprising
a tread portion comprising rows of shoulder blocks forming tread edges and rows of middle blocks arranged on an inner side in a tire axial direction of the shoulder blocks,
a carcass including an inner ply extending between bead cores of bead portions via the tread portion and side wall portions, and
bead apex rubbers each extending from a respective one of the bead cores, wherein
a ground contacting surface of each of the shoulder blocks and the middle blocks is provided with a narrow groove including a circumferential groove portion extending in a tire circumferential direction,
each of the bead apex rubbers includes an extended portion extending to a position on the inner side in the tire axial direction of a first reference line perpendicular to the ground contacting surface of each of the shoulder blocks and passing through the circumferential groove portion thereof,
the carcass includes an outer ply covering the outer end in the tire radial direction of the extended portion,
the inner ply has a ply main body portion extending between the bead cores and ply turned up portions each turned up around a respective one of the bead cores,
the inner ply is composed of a first ply and a second ply overlapping with each other in the tire radial direction such that the ply main body portion of the second ply is arranged radially outside the ply main body portion of the first ply,
an outer end of each of the ply turned up portions of the first ply terminates radially outside an outer end of a respective one of the ply turned up portions of the second ply, and
the outer ply covers at least the outer ends of the ply turned up portions of the first ply.

8. The tire for a motorcycle for rough terrain according to claim 7, wherein
an outer end in a tire radial direction of the extended portion is positioned on an outer side in the tire axial direction of a second reference line perpendicular to the ground contacting surface of each of the middle blocks and passing through the circumferential groove portion thereof.

9. The tire for a motorcycle for rough terrain according to claim 7, wherein
number of carcass cords of the outer ply per 5 cm of ply width thereof is not less than 44 (per 5 cm).

10. The tire for a motorcycle for rough terrain according to claim 7, wherein
the narrow groove has groove width not more than 2.5 mm,
the narrow groove includes the circumferential groove portion and a pair of axial groove portions extending outwardly in the tire axial direction from both ends of the circumferential groove portion, and
each of the axial groove portions has an opening connected with a block side surface on an outer side in the tire axial direction of the block.

11. The tire for a motorcycle for rough terrain according to claim 7, wherein
the carcass includes an outer ply covering the outer end in the tire radial direction of the extended portion,
the inner ply has a ply main body portion extending between the bead cores and ply turned up portions each turned up around a respective one of the bead cores,
the inner ply is composed of a first ply and a second ply overlapping with each other in the tire radial direction such that the ply main body portion of the second ply is arranged radially outside the ply main body portion of the first ply,
an insulation rubber layer is disposed between the ply main body portion of the first ply and the ply main body portion of the second ply, and
each of radially inner ends of the insulation rubber layer terminates on a radially inner side of the radially outer end of a respective one of the bead apex rubbers.

12. The tire for a motorcycle for rough terrain according to claim 11, wherein the insulation rubber layer is formed of rubber having a larger rubber hardness than a topping rubber of the carcass.

13. A tire for a motorcycle for rough terrain, the tire comprising:
a tread portion comprising rows of shoulder blocks forming tread edges and rows of middle blocks arranged on an inner side in a tire axial direction of the shoulder blocks,
a carcass including an inner ply extending between bead cores of bead portions via the tread portion and side wall portions, and
bead apex rubbers each extending from a respective one of the bead cores, wherein
a ground contacting surface of each of the shoulder blocks and the middle blocks is provided with a narrow groove including a circumferential groove portion extending in a tire circumferential direction,
each of the bead apex rubbers includes an extended portion extending to a position on the inner side in the tire axial direction of a first reference line perpendicular to the ground contacting surface of each of the shoulder blocks and passing through the circumferential groove portion thereof,
the carcass includes an outer ply covering the outer end in the tire radial direction of the extended portion,
the inner ply has a ply main body portion extending between the bead cores and ply turned up portions each turned up around a respective one of the bead cores,
the inner ply is composed of a first ply and a second ply overlapping with each other in the tire radial direction such that the ply main body portion of the second ply is arranged radially outside the ply main body portion of the first ply, and an insulation rubber layer is disposed between the ply main body portion of the first ply and the ply main body portion of the second ply.

14. The tire for a motorcycle for rough terrain according to claim 13, wherein
an outer end in a tire radial direction of the extended portion is positioned on an outer side in the tire axial direction of a second reference line perpendicular to the ground contacting surface of each of the middle blocks and passing through the circumferential groove portion thereof.

15. The tire for a motorcycle for rough terrain according to claim 13, wherein
number of carcass cords of the outer ply per 5 cm of ply width thereof is not less than 44 (per 5 cm).

16. The tire for a motorcycle for rough terrain according to claim 13, wherein
the narrow groove has groove width not more than 2.5 mm,
the narrow groove includes the circumferential groove portion and a pair of axial groove portions extending outwardly in the tire axial direction from both ends of the circumferential groove portion, and
each of the axial groove portions has an opening connected with a block side surface on an outer side in the tire axial direction of the block.

17. The tire for a motorcycle for rough terrain according to claim 13, wherein
the carcass includes an outer ply covering the outer end in the tire radial direction of the extended portion,
the inner ply has a ply main body portion extending between the bead cores and ply turned up portions each turned up around a respective one of the bead cores,
the inner ply is composed of a first ply and a second ply overlapping with each other in the tire radial direction such that the ply main body portion of the second ply is arranged radially outside the ply main body portion of the first ply,
an insulation rubber layer is disposed between the ply main body portion of the first ply and the ply main body portion of the second ply, and
each of radially inner ends of the insulation rubber layer terminates on a radially inner side of the radially outer end of a respective one of the bead apex rubbers.

18. The tire for a motorcycle for rough terrain according to claim 17, wherein the insulation rubber layer is formed of rubber having a larger rubber hardness than a topping rubber of the carcass.

* * * * *